Sept. 1, 1931.    R. GUNN    1,821,181
METHOD AND APPARATUS FOR TRANSFORMING ELECTRICAL ENERGY
Filed March 6, 1929

SECTION 2-2

Inventor
Ross Gunn

By Harold Dodd
Attorney

Patented Sept. 1, 1931

1,821,181

UNITED STATES PATENT OFFICE

ROSS GUNN, OF WASHINGTON, DISTRICT OF COLUMBIA

METHOD AND APPARATUS FOR TRANSFORMING ELECTRICAL ENERGY

Application filed March 6, 1929. Serial No. 344,802.

My invention relates broadly to methods and apparatus for transforming electrical energy and more particularly to transformers having a sharp resonance curve for any predetermined frequency.

The object of my invention is the production of a transformer which will pass alternating current of a predetermined frequency with very little resistance but will be practically opaque to frequencies slightly removed from the predetermined band of frequencies for which the particular transformer is designed.

Further objects of my invention will appear more fully hereinafter as the description of the method and apparatus is developed.

My invention contemplates in its method aspect the utilization of the mass-elastic resonance characteristics of a mechanical member to vary at a predetermined frequency the reluctance of a magnetic path thereby permitting the transformation of electrical energy at the predetermined frequency. The phenomena of mass-elastic resonance is utilized to render the transformer responsive to frequency equal to, or harmonically related to, the mass-elastic vibrations while rendering the transformer opaque to unrelated frequencies.

My invention consists substantially in the method, and in its apparatus aspect in the construction, combination and arrangement of parts associated therewith or as will be more fully hereinafter set forth as shown by the accompanying drawings and finally pointed out in the appended claims.

Reference is to be had to the accompanying drawings forming a part of this specification in which like reference characters indicate corresponding parts throughout the several views, and in which.

Figure 1:
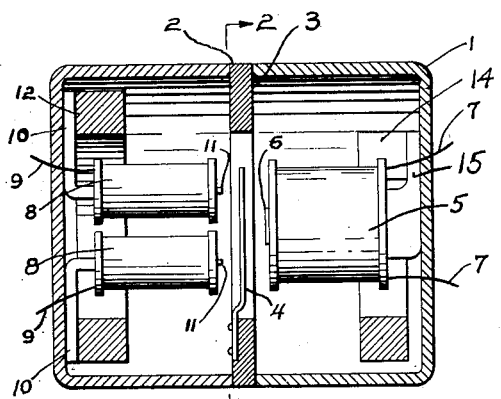
Figure 1 is a sectional view through my improved transformer.
Figure 2:
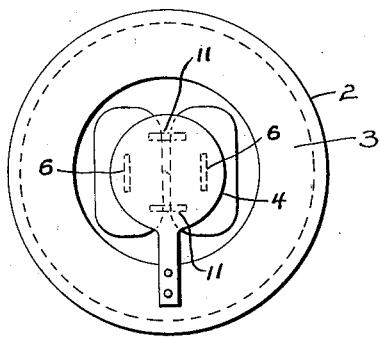
Figure 2 is a section through my transformer on the line 2—2 of Figure 1.

Referring to Figures 1 and 2, numeral 1 designates a casing through the middle of which there is an annulus or ring-like structure 2 forming a partition 3. A reed 4 of magnetic material is positioned in the opening of the annulus, the reed being so proportioned that it has a predetermined period of mechanical vibration.

Upon one side of this reed and in close proximity thereto are two primary coils 5, see Figure 2, the poles of which are so spaced from the reed 4 that at its maximum displacement toward the coils there remains but a very minute gap between each of the poles 6 and the reed. The coils are energized through the conductors 7.

Upon the opposite side of the reed 4 are the secondary coils 8 of the transformer, the leads of which are designated 9. The magnetic cores 10 of these coils are preferably formed L-shaped, the major lengths of the L-extending through the coils and terminating in poles 11 so spaced from the reed 4 that when the reed is in its position of maximum displacement toward the coils 8 there is a minute gap between the reed and the poles 11. The lesser lengths of the L cores may be attached to a permanent polarizing magnet 12 and extend along the inner surface of the casing 1 forming a substantially integral contact therewith. Magnet 12 surrounds and is attached to the cores 10 in such a manner as to maintain a strong flux throughout the magnetic system and reed.

The reed forms a common branch in the magnetic circuits of the coils 8 and 5. The magnetic circuit of the secondary coil 8 may be traced from the upper pole 11 through the upper leg 10, to the magnet 12, thence to the lower leg 10, to the lower pole 11, through the reed 4, back to the upper pole 11. The magnetic circuit of the primary coil 5 is similar but at substantially right angles to the secondary magnetic circuit as is shown in the drawing. The magnetic circuit of the primary coils 5 may be traced from the outer poles 6 through the outer leg 15 and the magnet 14, the inner leg (not shown), the inner pole 6 (the left hand pole, Figure 2) and through the reed 4 back to the outer pole 6.

The symmetrical balance of my transformer should be noted. From inspection of Figure 2 it is seen that the center of force of both magnets is at the center of the circular part of the reed 4. Each magnet exerts the same torque about the point at which the reed is pivoted, one magnet opposing the other. It is this perfect balance which makes my device responsive to very small currents of the proper frequency. In operation, when a small current in the primary 5 pulls the reed from the center position towards the primary polarized core 14, this core itself then helps to further displace the reed until the reversal of current in the primary coil 5 overcomes the pull of the primary permanent magnet 14, and allows the reed to return to, and, by its inertia, pass through the neutral point. As the reed 4 thus vibrates it materially varies the flux in the secondary permanent magnet 12, thereby inducing a voltage in the secondary 8.

Figure 3:
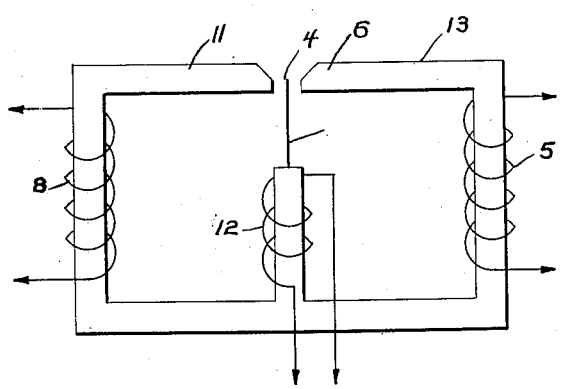
Figure 3 is a diagrammatic arrangement of the elements of my transformer.

Referring to Figure 3, numeral 13 designates the entire magnetic system, numeral 5 the primary of the transformer, numeral 8 the secondary of the transformer, and numeral 4 the vibrating reed. The poles 11 and 6 are shown spaced as described with reference to Figures 1 and 2.

The operation of my improved transformer is as follows: With the permanent magnetization of the system established by the permanent magnet or coil 12 and no current flowing in the coil 5 the reed stands in the position shown. If an alternating current is flowing in the coil 5 of such frequency that it is resonant with the natural period of the reed 4, the reed will vibrate between the poles 11 and 6 periodically producing a great increase in flux through the coil 8 when displaced toward the pole 11 and decreasing the flux through the coil 8 to a negligible value when displaced toward the pole 6. This action induces a high voltage in the leads 9 of the coils 8. One great advantage of the particular arrangement of Figure 1 is that the primary and secondary coils are so disposed that magnetic coupling due to causes other than the motion of the reed may be reduced to very low values. The primary and secondary systems are so placed that their mutual magnetic fields in the vicinity of the tuned reed are nearly at right angles.

Should the frequency of the current flowing in the coil 5 be of a frequency other than that of the reed 4, the reed will vibrate only a negligible amount. The gap between the poles 11 and 6 is such a size that there is but a negligible change in flux through the entire system 13 by the flux produced by the current in coil 5.

From the foregoing description of my invention it will be seen that I have produced a transformer which readily passes and amplifies alternating current of a frequency which is synchronous with the mechanical vibrations of the reed 4 and is substantially opaque to currents at a frequency which depart but very little from that assigned frequency.

It will be understood that the above description and accompanying drawings comprehend only the general and preferred embodiment of my invention and that minor detail changes in the construction and arrangement of parts may be made within the scope of the appended claims without sacrificing any of the advantages of my invention.

Having thus described my invention what I claim is:

1. In a coupling device, the combination of a casing, a partition having an opening therethrough and disposed within said casing, a reed of magnetic material having a predetermined vibrational period disposed within the opening, an input coil having a core of magnetic material disposed on one side of said reed, and an output coil having a core of magnetic material disposed on the opposite side of said reed, said reed forming a part of the magnetic paths of both coils.

2. In a coupling device, the combination of a casing, a partition having an opening therethrough and disposed within said casing, a reed of magnetic material having a predetermined vibrational period disposed within said opening, an input coil having a core of magnetic material disposed on one side of said reed, and an output coil having a core of magnetic material disposed on the other side of said reed, said core of said output coil being polarized, the fields of said primary and said secondary being mutually perpendicular, and said reed forming a part of the magnetic paths of both coils.

3. In a coupling device, a primary coil having a magnetic path comprising in part a core of magnetic material, a secondary coil having a polarized magnetic path and comprising in part a core of magnetic material, a reed of magnetic material forming a part of both of said magnetic paths, said primary coil adapted to cause said reed to vibrate, the vibrations of said reed causing an electromotive force to be produced in said secondary coil.

4. In a coupling device, a primary coil having a magnetic path comprising in part a core of magnetic material, a secondary coil having a polarized magnetic path and comprising in part a core of magnetic material, a reed of magnetic material forming a part of both of said magnetic paths, said primary coil adapted to cause said reed to vibrate, the vibrations of said reed causing an electromotive force to be produced in said secondary coil, said magnetic paths being mutually perpendicular.

5. A transformer comprising a primary winding wound upon a polarized magnetic core, a secondary winding wound upon a second polarized magnetic core at substantially right angles to and opposite said first mentioned magnetic core, and a reed forming a part of the magnetic circuit of each core, said reed determining the frequency of the currents transformed by said transformer.

6. A transformer comprising a primary winding wound upon a polarized magnetic core, a secondary winding wound upon a second polarized magnetic core at substantially right angles to and opposite said first mentioned magnetic core so that the center of force of the first magnet is opposite to that of the second magnet, and a reed forming a part of the magnetic circuit of each core, said reed being in a normal state of equilibrium between said cores, but being readily set into vibration by currents in the primary of a frequency equal to the natural period of the reed.

7. A transformer comprising a primary winding wound upon a polarized magnetic core, a secondary winding wound upon a second polarized magnetic core at substantially right angles to and opposite said first mentioned magnetic core so that the center of force of the first magnet is opposite to that of the second magnet, and a reed forming a part of the magnetic circuit of each core, said reed being in a normal state of equilibrium between said cores, but being readily set into vibration by currents in the primary of a frequency equal to the natural period of the reed, said polarizing magnets acting as prime movers in conjunction with the alternating flux set up by said currents.

8. A transformer comprising a principal winding wound upon a polarized magnetic core, a secondary winding wound upon a second polarized magnetic core so positioned with respect to said first magnetic core as to reduce to a minimum all effect of stray magnetic flux therebetween while maintaining at a maximum the desired mutual flux and a reed forming a part of the magnetic circuit of each core, said reed determining the frequency of currents transformed by said transformer.

ROSS GUNN.